US011209029B2

(12) United States Patent
Carlson et al.

(10) Patent No.: US 11,209,029 B2
(45) Date of Patent: Dec. 28, 2021

(54) HYDRAULIC POWER PACK SYSTEM

(71) Applicant: Green Hydraulic Power, Inc., Huntington Beach, CA (US)

(72) Inventors: Per Carlson, Huntington Beach, CA (US); José Machuca, Huntington Beach, CA (US); Jianqing Wang, Huntington Beach, CA (US); Donald Hebert, Huntington Beach, CA (US); Carl Lorentzen, Huntington Beach, CA (US)

(73) Assignee: GREEN HYDRAULIC POWER, INC., Huntington Beach, CA (US)

(*) Notice: Subject to any disclaimer, the term of this patent is extended or adjusted under 35 U.S.C. 154(b) by 2 days.

(21) Appl. No.: 16/536,100

(22) Filed: Aug. 8, 2019

(65) Prior Publication Data

US 2020/0217335 A1    Jul. 9, 2020

Related U.S. Application Data

(60) Provisional application No. 62/788,633, filed on Jan. 4, 2019.

(51) Int. Cl.
*F15B 21/08* (2006.01)

(52) U.S. Cl.
CPC .................................. *F15B 21/08* (2013.01)

(58) Field of Classification Search
CPC ....................................................... F15B 21/08
USPC ........................................................... 60/431
See application file for complete search history.

(56) References Cited

U.S. PATENT DOCUMENTS

| 2012/0029775 A1* | 2/2012 | Peters | B60W 30/1888 |
| | | | 701/50 |
| 2013/0153038 A1* | 6/2013 | Barden | F17D 1/08 |
| | | | 137/1 |
| 2015/0013321 A1* | 1/2015 | Karlsson | F15B 21/0423 |
| | | | 60/456 |

OTHER PUBLICATIONS

Siemens; Sinamics S120 AC Drive Manual; Apr. 2014, 1-500 pages, Germany.

(Continued)

*Primary Examiner* — Abiy Teka
*Assistant Examiner* — Daniel S Collins
(74) *Attorney, Agent, or Firm* — Stetina Brunda Garred & Brucker (57) ABSTRACT

A hydraulic power pack for use in a hydraulic system includes a reservoir configured to receive hydraulic fluid. A pump is in communication with the reservoir and is fluidly connectable to the hydraulic system. The pump is configured to pump hydraulic fluid from the reservoir into the hydraulic system when connected thereto. A hydraulic fluid sensor is fluidly connectable to the hydraulic system to sense a fluid characteristic of the hydraulic fluid within the hydraulic system. A variable speed drive is operatively coupled to the pump and the hydraulic fluid sensor to receive sensor data therefrom, with the variable speed drive being configured to generate a pump control signal based on the received sensor data. The pump is configured to operate at various speeds based on the pump control signal received from the variable speed drive.

17 Claims, 5 Drawing Sheets

(56) References Cited

OTHER PUBLICATIONS

Siemens; Product Details Siemens Simotics 3—(1P) 1PH8133-1UD02-1LC1; [retrieved Aug. 2019]; Retrieved from the Internet: https://mall.industry.siemens.com/mall/en/WW/Catalog/Product/?mlfb=1PH8133-2.F0.-...1.

IConAmma-2017; IOP Conf. Series: Materials Science and Engineering; 2017; 1-8 pages; IOP Publishing.

* cited by examiner

HYDRAULIC POWER PACK SYSTEM

CROSS-REFERENCE TO RELATED APPLICATIONS

This application claims the benefit of U.S. Provisional Application No. 62/788,633, filed Jan. 4, 2019, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a hydraulic power pack, and more specifically, to a hydraulic power pack having a variable speed drive which reduces power consumption and operational noise.

2. Description of the Related Art

Hydraulic power is used in many industrial and commercial applications for providing power to tools and machines. In general, a hydraulic power system may utilize a one or more pipes carrying pressurized liquid used to transfer mechanical power from a power source, such as a pump, to hydraulic equipment, such as lifts or motors. For instance, several manufacturing tools and metal forming tools, such as CNC machines, rolling machines, flow forming machines, utilize hydraulic power.

In many conventional hydraulic power systems, the pump operates at a constant speed to pressurize the fluid within the system, irrespective of the load demands required by the system. In other words, whether the load demands are high or low, the pump operates at a constant speed, which may be sufficient to satisfy the high load demands of the system. Although operation of the pump at a constant speed may facilitate operation of the desired tool or machine, there may be undesirable consequences associated therewith.

One particular drawback is that constant operation of the pump at a high speed may lead to unnecessary consumption of power, particularly during periods of low load demands. Unnecessary consumption of power may be associated with high operational costs, as well as a negative impact on the environment.

Another drawback associated with operation of the pump at a constant, high speed is that it may result in a loud environment, which may make it difficult to communicate. In this regard, the hydraulic equipment may be used on an assembly line or other manufacturing environment, wherein several people may be working together, and thus, may need to verbally communicate with each other. The loud noise associated with operating the pump at a constant high speed may make it difficult to communicate, and thus, may lead to miscommunications. When miscommunications occur in a work environment, safety may be compromised, along with work efficiency.

Accordingly, there is a need in the art for a hydraulic power system that is more energy efficient and quieter and more suitable for use in workplace environments. Various aspects of the present disclosure address this particular need, as will be discussed in more detail below.

BRIEF SUMMARY

In accordance with one embodiment of the present disclosure, there is provided a hydraulic power pack for use in a hydraulic system. The hydraulic power pack includes a reservoir configured to receive hydraulic fluid. A pump is in communication with the reservoir and is fluidly connectable to the hydraulic system. The pump is configured to pump hydraulic fluid from the reservoir into the hydraulic system when connected thereto. A hydraulic fluid sensor is fluidly connectable to the hydraulic system to sense a fluid characteristic of the hydraulic fluid within the hydraulic system. A variable speed drive is operatively coupled to the pump and the hydraulic fluid sensor to receive sensor data therefrom, with the variable speed drive being configured to generate a pump control signal based on the received sensor data. The pump is configured to operate at various speeds based on the pump control signal received from the variable speed drive.

The hydraulic fluid sensor may be a pressure sensor.

The hydraulic power pack may include a motor coupled to the variable speed drive and the pump, with the motor being configured to drive the pump in accordance with the pump control signal.

The hydraulic power pack may further comprise a filter in fluid communication with the pump to filter impurities from the hydraulic fluid as the hydraulic fluid flows through the filter.

The hydraulic power pack may additionally include a heat exchanger in fluid communication with the pump to facilitate heat transfer in relation to the hydraulic fluid flowing therethrough.

The hydraulic power pack may also comprise a pressure relief valve in fluid communication with the pump and the reservoir. The pressure relief valve may be transitional between a closed position and an open position. In the closed position, hydraulic fluid may be restricted from flowing through the pressure relief valve, and in the open position, hydraulic fluid may be capable of flowing through the pressure relief valve and toward the reservoir. The pressure relief valve may be configured to transition from the closed position toward the open position in response to pressure upstream of the pressure relief valve being higher than a prescribed pressure threshold.

The hydraulic power pack may be configured to operate in at least one operational mode at a noise level that is a maximum of 65 dBA.

According to another embodiment, there is provided a hydraulic system comprising a reservoir configured to receive hydraulic fluid. A pump is in communication with the reservoir and is configured to pump hydraulic fluid from the reservoir. The hydraulic system additionally includes a hydraulic actuator including a cylinder and a piston moveable within the cylinder, with the piston and cylinder collectively defining a first chamber and a second chamber. A direction control valve is in communication with the pump, the reservoir, and the hydraulic actuator. The direction control valve is transitional between a first position and a second position. In the first position, the direction control valve directs fluid from the pump into the first chamber and exhausts the second chamber by directing fluid therefrom toward the reservoir. In the second position, the direction control valve directs fluid from the pump into the second chamber and exhausts the first chamber by direction fluid therefrom toward the reservoir. A hydraulic fluid sensor is downstream of the pump and upstream of the hydraulic actuator to sense a fluid characteristic of the hydraulic fluid between the pump and the hydraulic actuator. A variable speed drive is operatively coupled to the pump and the hydraulic fluid sensor to receive sensor data therefrom. The variable speed drive is configured to generate a pump control signal based on the received sensor data. The pump is configured to operate at various speeds based on the pump control signal received from the variable speed drive.

According to another embodiment, there is provided a method of operating a hydraulic system. The method includes the steps of: pumping hydraulic fluid from a reservoir to a hydraulic actuator; sensing a pressure of the hydraulic fluid flowing from the pump to the hydraulic actuator; generating a pump control signal at a variable speed drive operatively coupled to the pump based on the sensed pressure; and modifying the speed of the pump based on the pump control signal received from the variable speed drive.

The method may also include the step of operating a motor coupled to the variable speed drive and the pump, with the motor being configured to drive the pump in accordance with the pump control signal.

The method may further include the step of filtering impurities from the hydraulic fluid.

The method may additionally include the step of exchanging heat with the hydraulic fluid.

The method may include the step of transitioning a pressure relief valve between a closed position and an open position, in the closed position, hydraulic fluid is restricted from flowing through the pressure relief valve, and in the open position, hydraulic fluid is capable of flowing through the pressure relief valve and toward the reservoir, the pressure relief valve being configured to transition from the closed position toward the open position in response to pressure upstream of the pressure relief valve being higher than a prescribed pressure threshold.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Referring now to the drawings, wherein the showings are for purposes of illustrating a preferred embodiment of the present disclosure, and are not for purposes of limiting the same, there is depicted a hydraulic power pack 10, which utilizes a variable speed drive 12 (see FIG. 5) to reduce energy consumption relative to conventional power packs, while also being capable of delivering pressure and flow on demand. A primary advantage of utilizing a variable speed drive 12 is the energy cost savings associated with speed control. In a conventional hydraulic power unit, the motor may run at a constant speed, whereas a variable speed drive 12 reduces the actual motor speed, which in turn, reduces the amps drawn by the motor. Another advantage associated with the variable speed drive 12 is that the noise associated with operation of the hydraulic power pack 10 may be significantly less than the noise associated with conventional hydraulic power units. For instance, the average noise level of a conventional hydraulic power unit may be 85 dBA, compared to an average noise level of 65 dBA associated with certain implementations of the hydraulic power pack 10 of the present disclosure. Accordingly, the reduced noise may result in a safer and more appealing work environment for those working near the hydraulic power pack 10.

Figure 1:
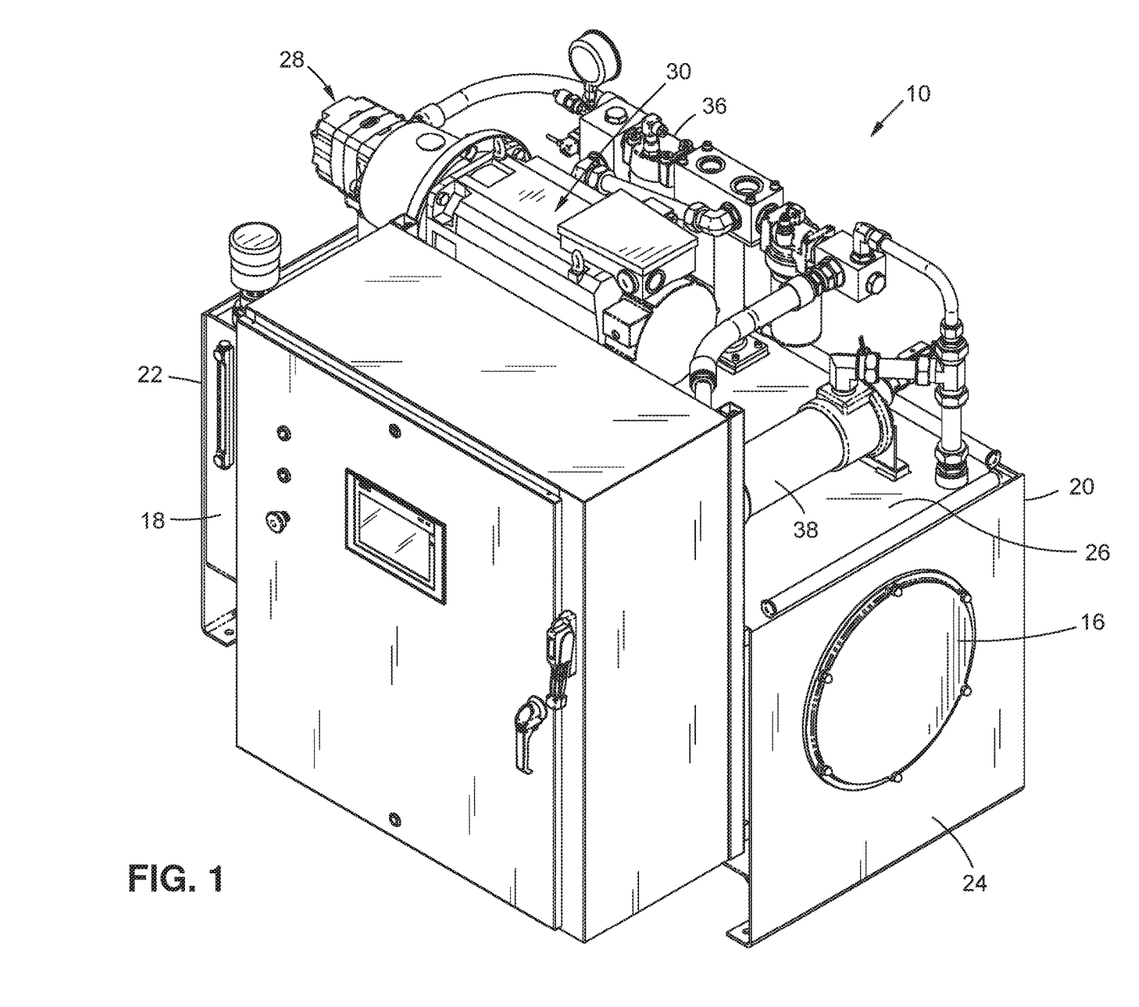
FIG. 1 is an upper perspective view of a hydraulic power pack according to an embodiment of the present disclosure.
Figure 2:
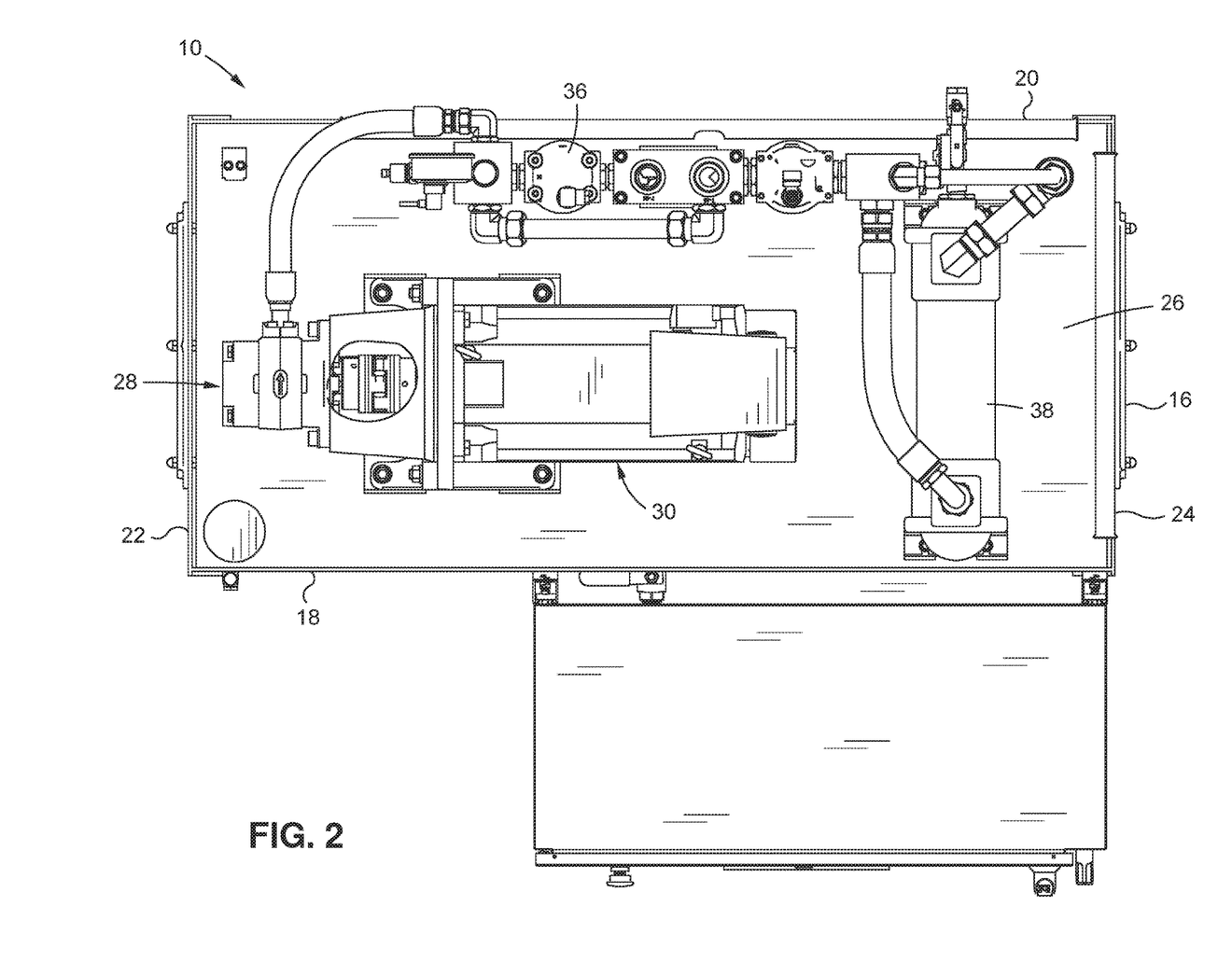
FIG. 2 is a top view of the hydraulic power pack of FIG. 1.
Figure 3:
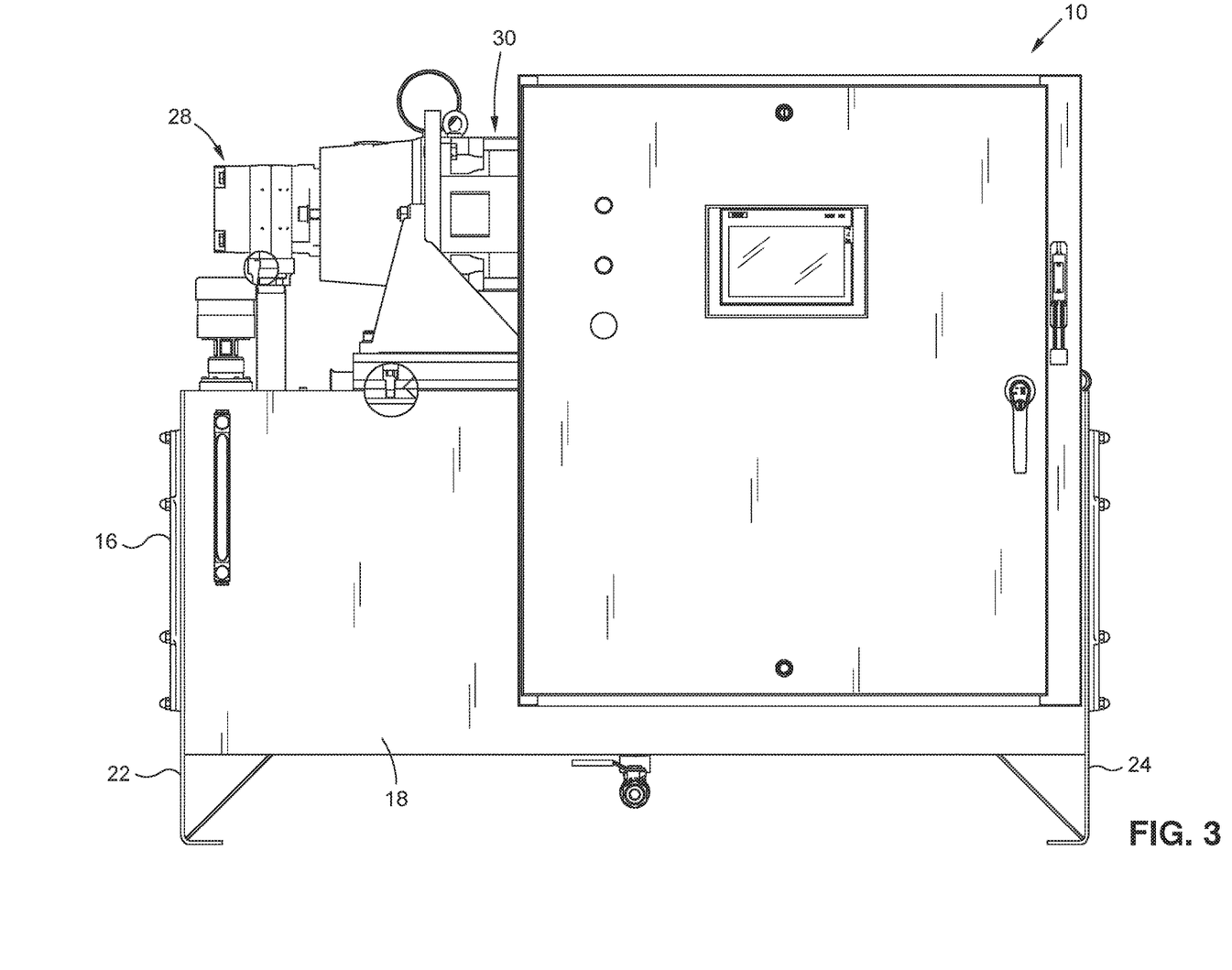
FIG. 3 is a front view of the hydraulic power pack of FIG. 1.
Figure 4:
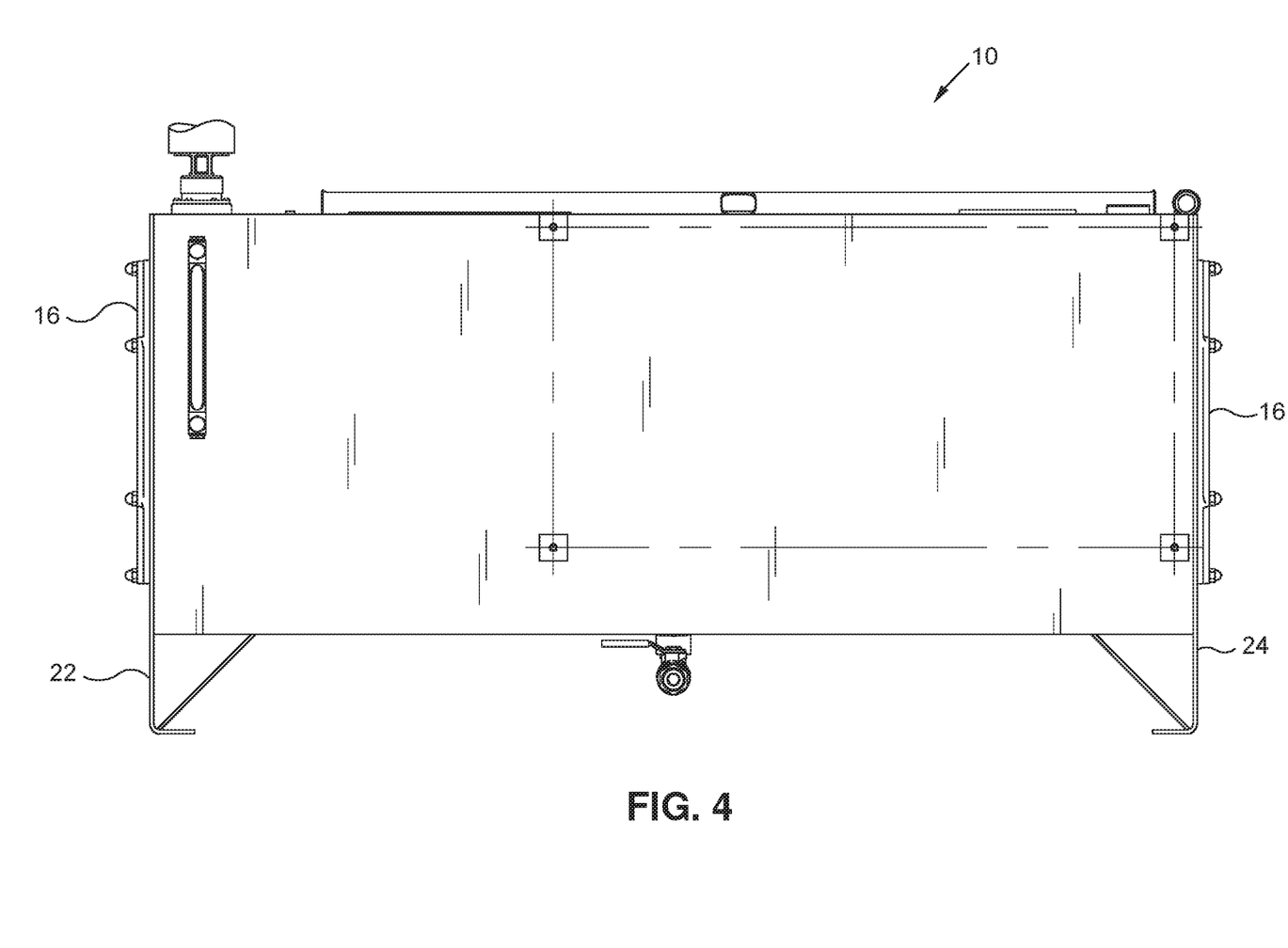
FIG. 4 is a bottom view of the hydraulic power pack of FIG. 1.
Figure 5:
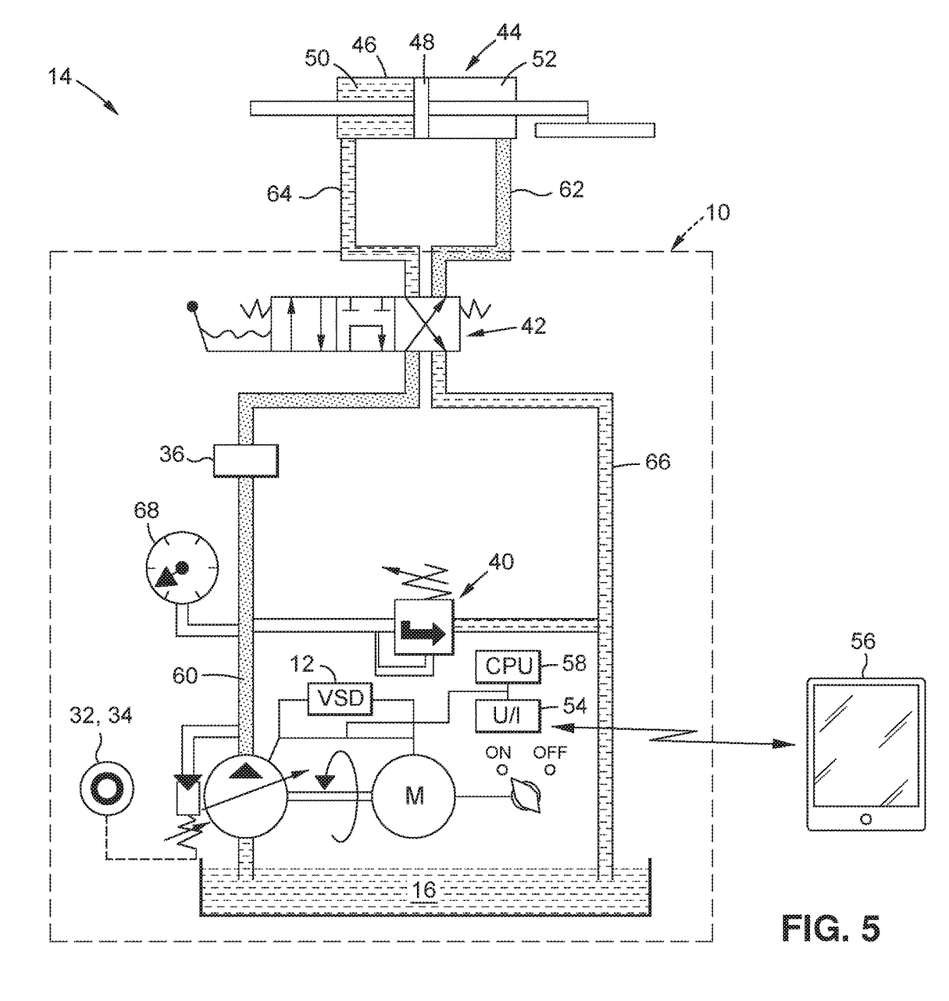
FIG. 5 is a schematic view of a hydraulic system including a variable speed drive.

FIGS. 1-4 are various views of one embodiment of a hydraulic power pack 10, while FIG. 5 is a schematic view of the hydraulic power pack 10 integrated into a hydraulic system 14. According to one embodiment, the hydraulic power pack 10 includes a reservoir 16 configured to receive hydraulic fluid. The reservoir 16 may be available in various sizes, such as 100-gallon, 200-gallon, or 300-gallon sizes, although, in general, the size of the reservoir 16 may vary depending on the demands of the particular application. In this regard, certain applications may allow for a reservoir 16 that is less than 100 gallons, while other applications may require a reservoir 16 that is greater than 300 gallons. The reservoir 16 may be located within a housing, which is comprised of a forward wall 18, a rear wall 20, a pair of opposed sidewalls 22, 24, and an upper wall 26. The hydraulic fluid stored within the reservoir 16 may include oil or other hydraulic fluids known by those skilled in the art.

A pump 28 is in communication with the reservoir 16 and is configured to pump hydraulic fluid from the reservoir 16 toward a hydraulic actuator. The pump 28 may be mounted on top of the housing. A motor 30 may be coupled to the pump 28, with the motor 30 being configured to drive the pump 28. An exemplary pump is a Voith Type IPVAP 4-32 171 pump, although it is understood that other pumps may be used without departing from the spirit and scope of the present disclosure. An exemplary motor is a Siemens Simotics 3-(1P) 1PH8133-1UD02-1LC1, although other pumps may be used without departing from the spirit and scope of the present disclosure.

A variable speed drive 12 may be connected to the pump 28 and operative to control the pump 28 based on detected characteristics of the hydraulic fluid within the hydraulic system 14. For instance, the speed of the pump 28 may be increased or decreased based on the demands required by the hydraulic system 14. For instance, a particular demand may be associated with a prescribed pressure within the hydraulic system 14. When the pressure within the system 14 is below that prescribed threshold, the speed of the pump 28 may be elevated. Conversely, when the pressure within the system 14 is at or above the prescribed threshold, the speed of the pump 28 may be lowered. The use of the variable speed drive 12 allows constant hydraulic power and flow to be provided on demand. The variable speed drive 12 may increase efficiency by allowing motors to be operated at the ideal speed for different operating load conditions. In many applications, the variable speed drive 12 may reduce motor electricity consumption by up to 85%. An exemplary drive is a Siemens Sinamics Power Module 340, although other drives may be used without departing from the spirit and scope of the present disclosure.

In order to monitor the fluid characteristics within the system, one embodiment includes a hydraulic fluid sensor 32 fluidly connectable to the hydraulic system 14 to sense a fluid characteristic of the hydraulic fluid within the hydraulic system 14. For instance, the hydraulic fluid sensor 32 may be a pressure sensor 34 capable of measuring the pressure of the fluid downstream of the pump 28. The variable speed drive 12 may be operatively coupled to the hydraulic fluid sensor 32 to receive sensor data therefrom, and may be configured to generate a pump control signal based on the received sensor data. The pump 28 is configured to operate at various speeds based on the pump control signal received from the variable speed drive 12.

Other examples of hydraulic fluid sensors 32 that may be used include temperature sensors and flow rate sensors. In this regard, the temperature and/or the flow rate of the hydraulic fluid may be monitored and used as a parameter when controlling the speed of the pump 28.

The hydraulic power pack 10 may further comprise a filter 36 in fluid communication with the pump 28 to filter impurities from the hydraulic fluid as the hydraulic fluid flows through the filter 36.

The hydraulic power pack 10 may additionally include a heat exchanger 38 in fluid communication with the pump 28 to facilitate heat transfer in relation to the hydraulic fluid flowing therethrough.

The hydraulic power pack 10 may also comprise a pressure relief valve 40 in fluid communication with the pump 28 and the reservoir 16. The pressure relief valve 40 may be transitional between a closed position and an open position. In the closed position, hydraulic fluid may be restricted from flowing through the pressure relief valve 40, and in the open position, hydraulic fluid may be capable of flowing through the pressure relief valve 40 and toward the reservoir 16. The pressure relief valve 40 may be configured to transition from the closed position toward the open position in response to pressure upstream of the pressure relief valve 40 being higher than a prescribed pressure threshold.

The hydraulic power pack 10 may further include a direction control valve 42 to control the flow of hydraulic fluid in the system 14. In the exemplary direction control valve 42 depicted in FIG. 5, the valve 42 may be transitioned between three separate positions, namely, a parallel pass through position, a return position, and a crossing flow position. The positions of the direction control valve 42 will be described in more detail below in relation to operation of the hydraulic power pack 10.

Referring now specifically to FIG. 5, the hydraulic power pack 10 may be connected to a hydraulic actuator 44 including a cylinder 46 and a piston 48 moveable within the cylinder 46. The piston 48 and cylinder 46 may collectively define a first chamber 50 and a second chamber 52. The piston 48 may be moveable relative to the cylinder 46, which may result in a change in the volume of the first chamber 50 and the second chamber 52. In particular, when the piston 48 is moved in a first direction, the volume of the first chamber 50 may decrease and the volume of the second chamber 52 may increase. Conversely, when the piston 48 is moved in a second direction, the volume of the first chamber 50 may increase and the volume of the second chamber 52 may decrease. Thus, by selectively increasing and decreasing the sizes of the first and second chambers 50, 52, a position of the hydraulic actuator 44 may be controlled.

The hydraulic power pack 10 may include an onboard user interface 54 to facilitate control over the operation thereof. It is also contemplated that the hydraulic power pack 10 may be configured to allow for remote control thereof, such as view a smartphone 56, tablet computer, personal computer, etc. In this regard, the hydraulic power pack 10 may include a communications circuit, which may facilitate bi-directional communications between the hydraulic power pack 10 and the remote control device.

In use, a user may input a command associated with a desired position of the hydraulic actuator 44. A difference in position of the actuator 44 from an actual position to the desired position may be calculated by an onboard central processing unit (CPU) 58 and correlated to a change in volume in the first and second chambers 50, 52 may be calculated. In order to effectuate the calculated change, a required fluid flow into and out of the respective first and second chambers 50, 52 is determined, and the direction control valve 42 may be moved to a position associated with the required fluid flow. FIG. 5 shows the direction control valve 42 in the crossing flow position, wherein fluid from the pump 28 is directed into the second chamber 52, and fluid from the first chamber 50 is exhausted therefrom and is directed to the reservoir 16. Such a flow will increase the volume of the second chamber 52, while simultaneously decreasing the volume in the first chamber 50, which will move the piston 48 to the left, from the perspective shown in FIG. 5. To move the piston 48 to the right, the direction control valve 42 may be transitioned to the parallel pass through position, wherein fluid from the pump 28 is directed into the first chamber 50, and fluid from the second chamber 52 is exhausted therefrom and is directed to the reservoir 16. Such a flow will increase the volume of the first chamber 50, while simultaneously decreasing the volume in the second chamber 52. The direction control valve 42 includes a return position, wherein fluid from the pump 28 is returned to the reservoir 16, rather than being directed into one of the first and second chambers 50, 52. When the direction control valve 42 is in the return position, fluid in the first and second chambers 50, 52 is blocked by the direction control valve 42 to maintain the volume of the first and second chambers 50, 52.

With the crossing flow position shown in FIG. 5 as an example, the pump 28 pumps the hydraulic fluid through pump outlet passageway 60, which is in communication with second chamber passageway 62. Hydraulic fluid in the first chamber 50 is exhausted through first chamber passageway 64, which is in communication with reservoir inlet passageway 66.

A pressure sensor 34 may sense the fluid pressure in the pump outlet passageway 60 and may communicate the sensed pressure to the CPU 58, as well as to an onboard digital display, or to a remote display device, such as smartphone 56. A pressure gauge 68 may also be in communication with the pump outlet passageway 66 to provide an alternative means by which the pressure may be displayed.

When the pressure within the pump outlet passageway 60 exceeds a preset maximum pressure, a pressure relief valve 40 may open, to allow fluid pumped from the pump 28 to be redirected back into the reservoir 16 via the reservoir inlet passageway 66. Furthermore, the speed of the pump 28 may be reduced by the variable speed drive 12, which reduces the energy demands of the pump 28 and allows the pump 28 to maintain the desired pressure at a lower noise level, which in some cases can be as lowered by 20 dBA, e.g., from 85 dBA to 65 dBA. The reduced speed of the pump 28 may also advantageously lower the heat generation within the hydraulic fluid. Additionally, the ability of the pump 28 to operate at lower speeds, while also meeting the operational demands, results in less wear and tear on the system 14, which may lengthen the life of the pump 28.

Various embodiments of the hydraulic power pack 10 may be configured to meet the specifications associated with the Internet of Things (IoT), which may refer to the use of intelligently connected devices and system to leverage data gathered by embedded sensors and actuators in machines and other physical objects. The hydraulic power pack 10 may also be Industry 4.0 ready. In this regard, the hydraulic power pack 10 may include cyber-physical systems, the Internet of Things, cloud computing and cognitive computing. The hydraulic power pack 10 may also be connected to one or more eternal control devices for monitoring, which may allow for supervisory control and data acquisition (SCADA) readiness or capabilities. The hydraulic power pack 10 may also meet UL specifications and requirements.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A hydraulic power pack for use in a hydraulic system, the hydraulic power pack comprising:
   a reservoir configured to receive hydraulic fluid;
   a pump in communication with the reservoir and fluidly connectable to the hydraulic system, the pump being configured to pump hydraulic fluid from the reservoir into the hydraulic system when connected thereto;
   a hydraulic fluid sensor fluidly connectable to the hydraulic system to sense a fluid characteristic of the hydraulic fluid within the hydraulic system; and
   a variable speed drive operatively coupled to the pump and the hydraulic fluid sensor to receive sensor data therefrom, the variable speed drive being configured to generate a pump control signal based on the received sensor data;
   the pump being configured to operate at various speeds based on the pump control signal received from the variable speed drive;
   wherein the hydraulic power pack is configured to operate in at least one operational mode at a noise level that is a maximum of 65 dBA.

2. The hydraulic power pack recited in claim 1, further comprising a motor coupled to the variable speed drive and the pump, the motor being configured to drive the pump in accordance with the pump control signal.

3. The hydraulic power pack recited in claim 1, wherein the hydraulic fluid sensor is a pressure sensor.

4. The hydraulic power pack recited in claim 1, further comprising a heat exchanger in fluid communication with the pump to facilitate heat transfer in relation to the hydraulic fluid flowing therethrough.

5. The hydraulic power pack recited in claim 1, further comprising a pressure relief valve in fluid communication with the pump and the reservoir, the pressure relief valve being transitional between a closed position and an open position, in the closed position, hydraulic fluid is restricted from flowing through the pressure relief valve, and in the open position, hydraulic fluid is capable of flowing through the pressure relief valve and toward the reservoir, the pressure relief valve being configured to transition from the closed position toward the open position in response to pressure upstream of the pressure relief valve being higher than a prescribed pressure threshold.

6. A hydraulic system comprising:
   a reservoir configured to receive hydraulic fluid;
   a pump in communication with the reservoir and configured to pump hydraulic fluid from the reservoir;
   a hydraulic actuator including a cylinder and a piston moveable within the cylinder, the piston and cylinder collectively defining a first chamber and a second chamber;
   a direction control valve in communication with the pump, the reservoir and the hydraulic actuator, the direction control valve being transitional between a first position and a second position, in the first position, the direction control valve directs fluid from the pump into the first chamber, and exhausts the second chamber by directing fluid therefrom toward the reservoir, in the second position, the direction control valve directs fluid from the pump into the second chamber, and exhausts the first chamber by direction fluid therefrom toward the reservoir;
   a hydraulic fluid sensor downstream of the pump and upstream of the hydraulic actuator to sense a fluid characteristic of the hydraulic fluid between the pump and the hydraulic actuator; and
   a variable speed drive operatively coupled to the pump and the hydraulic fluid sensor to receive sensor data therefrom, the variable speed drive being configured to generate a pump control signal based on the received sensor data;
   the pump being configured to operate at various speeds based on the pump control signal received from the variable speed drive;
   wherein the hydraulic system is configured to operate in at least one operational mode at a noise level that is a maximum of 65 dBA.

7. The hydraulic system recited in claim 6, further comprising a motor coupled to the variable speed drive and the pump, the motor being configured to drive the pump in accordance with the pump control signal.

8. The hydraulic system recited in claim 6, wherein the hydraulic fluid sensor is a pressure sensor.

9. The hydraulic system recited in claim 6, further comprising a filter in fluid communication with the pump to filter impurities from the hydraulic fluid as the hydraulic fluid flows through the filter.

10. The hydraulic system recited in claim 6, further comprising a heat exchanger in fluid communication with the pump to facilitate heat transfer in relation to the hydraulic fluid flowing therethrough.

11. A method of operating a hydraulic system, the method comprising the steps of:
    pumping hydraulic fluid from a reservoir to a hydraulic actuator;
    sensing a pressure of the hydraulic fluid flowing from the pump to the hydraulic actuator;
    generating a pump control signal at a variable speed drive operatively coupled to the pump based on the sensed pressure;
    modifying the speed of the pump based on the pump control signal received from the variable speed drive; and
    operating the hydraulic system in at least one operational mode at a noise level that is a maximum of 65 dBA.

12. The method recited in claim 11, further comprising the step of operating a motor coupled to the variable speed drive and the pump, the motor being configured to drive the pump in accordance with the pump control signal.

13. The method recited in claim 11, further comprising the step of exchanging heat with the hydraulic fluid.

14. The method recited in claim 11, further comprising the step of transitioning a pressure relief valve between a closed position and an open position, in the closed position, hydraulic fluid is restricted from flowing through the pressure relief valve, and in the open position, hydraulic fluid is capable of flowing through the pressure relief valve and toward the reservoir, the pressure relief valve being configured to transition from the closed position toward the open position in response to pressure upstream of the pressure relief valve being higher than a prescribed pressure threshold.

15. The hydraulic power pack recited in claim 1, further comprising a filter in fluid communication with the pump to filter impurities from the hydraulic fluid as the hydraulic fluid flows through the filter.

16. The hydraulic system recited in claim 6, further comprising a pressure relief valve in fluid communication with the pump and the reservoir, the pressure relief valve being transitional between a closed position and an open position, in the closed position, hydraulic fluid is restricted from flowing through the pressure relief valve, and in the open position, hydraulic fluid is capable of flowing through the pressure relief valve and toward the reservoir, the pressure relief valve being configured to transition from the closed position toward the open position in response to pressure upstream of the pressure relief valve being higher than a prescribed pressure threshold.

17. The method recited in claim 11, further comprising the step of filtering impurities from the hydraulic fluid.

* * * * *